United States Patent
Lu et al.

(10) Patent No.: US 7,539,261 B2
(45) Date of Patent: May 26, 2009

(54) MULTI-LAYER CODED MODULATION FOR NON-ERGODIC BLOCK FADING CHANNELS

(75) Inventors: Ben Lu, Plainsboro, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 673 days.

(21) Appl. No.: 11/259,323

(22) Filed: Oct. 26, 2005

(65) Prior Publication Data
US 2007/0041461 A1    Feb. 22, 2007

Related U.S. Application Data

(60) Provisional application No. 60/710,095, filed on Aug. 22, 2005.

(51) Int. Cl.
*H04B 7/02* (2006.01)
(52) U.S. Cl. ...................................................... 375/267
(58) Field of Classification Search ......... 375/260–262, 375/265, 267, 299, 340, 341, 347; 714/794, 714/795
See application file for complete search history.

(56) References Cited

U.S. PATENT DOCUMENTS

2005/0220211 A1* 10/2005 Shim et al. ................. 375/267
2006/0233280 A1* 10/2006 Tynderfeldt et al. ......... 375/299

* cited by examiner

*Primary Examiner*—Young T. Tse
(74) *Attorney, Agent, or Firm*—James Bitetto

(57) ABSTRACT

A multi-layer coded modulation technique is disclosed for a wireless communication system with non-ergodic channels, which is particularly advantageous for multiple-input multiple-output (MIMO) systems.

20 Claims, 3 Drawing Sheets

(A)

(B)

US 7,539,261 B2

MULTI-LAYER CODED MODULATION FOR NON-ERGODIC BLOCK FADING CHANNELS

CROSS-REFERENCE TO RELATED APPLICATIONS

This application claims the benefit of and is a nonprovisional of U.S. Provisional Application No. 60/710,095, entitled "DESIGN OF MULTI-LAYER CODED MODULATION FOR NON-ERGODIC BLOCK FADING CHANNELS," filed on Aug. 22, 2005, the contents of which are incorporated herein by reference.

BACKGROUND OF INVENTION

The invention relates generally to modulation techniques in wireless communication systems.

Multiple-input multiple-output (MIMO) data transmission through sparsely-spaced antennas at both the transmitter and receiver provides a substantial increase in spectral efficiency of wireless links. MIMO transmission can potentially accomplish a multiplexing gain (i.e., an information rate increase due to virtual multiple wireless links) and a diversity gain (i.e., a spatial diversity due to multiple antennas in addition to time-domain and frequency-domain diversity). A key to realizing high data rates in such MIMO systems is a practical coded modulation scheme. From a data block size perspective, one may categorize prior art coded modulation schemes as follows. For small block size (e.g., smaller than ten), there are many solutions, such as orthogonal space-time block codes, linear dispersion codes, threaded algebraic space-time codes, and lattice space-time codes. When the block size is around several hundred, options include space-time trellis codes and "wrapped" space-time codes.

Consider, however, moderate-to-large block sizes (e.g., larger than a thousand) which are suitable for most data traffic in broadband communications. In this design regime, existing schemes are mostly based on powerful binary random codes (e.g., turbo codes or LDPC codes). They include bit-interleaved coded modulation (BICM), (see E. Zehavi, "8-PSK Trellis Codes for a Rayleigh Channel," IEEE Trans. Communi., Vol. 40, pp. 873-84 (May 1992); Y. Liu et al., "Full Rate Space-Time Turbo Codes," IEEE J. Select. Areas in Commun., Vol. 19, pp. 969-80 (2001)), multilevel coded modulation (MLC) (see H. Imai and S. Hirakawa, "A New Multilevel Coding Method using Error-Correcting Codes," IEEE Trans. Inform. Theory, Vol. 23, pp. 371-77 (May 1977); L. J. Lampe et al., "Multilevel Coding for Multiple Antenna Transmission," IEEE Trans. Wireless Commun., Vol. 3, pp. 203-08 (2004)), and stratified diagonal BLAST (see M. Sellathurai and G. Foschini, "Stratified Diagonal Layered Space-Time Architectures: Signal Processing and Information Theoretic Aspects," IEEE Trans. Sig. Proc., Vol. 51, pp. 2943-54 (November 2003)). The recently proposed stratified D-BLAST is a coded D-BLAST, where different coding rates and transmission powers are assigned to different threads of D-BLAST. Among these schemes, BICM is considered to be simple and asymptotically capacity-approaching in both ergodic and non-ergodic channels, with the computation of a number of turbo receiver iterations. MLC requires channel-specific design of coding rates and constellation mapping functions for the different levels of MLC. On the other hand, MLC can be optimized for various objectives, such as providing unequal error protection. With the simple multi-stage decoding receiver, MLC is asymptotically capacity-approaching in ergodic MIMO fading channels—however is not so in non-ergodic fading channels.

SUMMARY OF INVENTION

A multi-layer coded modulation technique is disclosed for a wireless communication system with non-ergodic channels, which is particularly advantageous for multiple-input multiple-output (MIMO) systems. At the transmitter, multiple information data blocks are independently coded by different binary random encoders and mapped to complex symbols. The symbols from all the layers are transmitted in distinct transmission slots (e.g., space-time slots or space-frequency slots). At the receiver, a successive decoding structure is employed to recover the information data layer-by-layer. A systematic design procedure is disclosed which maximizes the information rate subject to an upper bound on the decoding error probability. This can be achieved by providing equal error protection of different layers at the target decoding error probability. Spatial interleaving is advantageously employed, which offers superior and consistent performance in various channel environments. With proper design of the multi-layer coded modulation arrangement, good performance can be obtained in non-ergodic channels.

These and other advantages of the invention will be apparent to those of ordinary skill in the art by reference to the following detailed description and the accompanying drawings.

DETAILED DESCRIPTION

Figure 1:
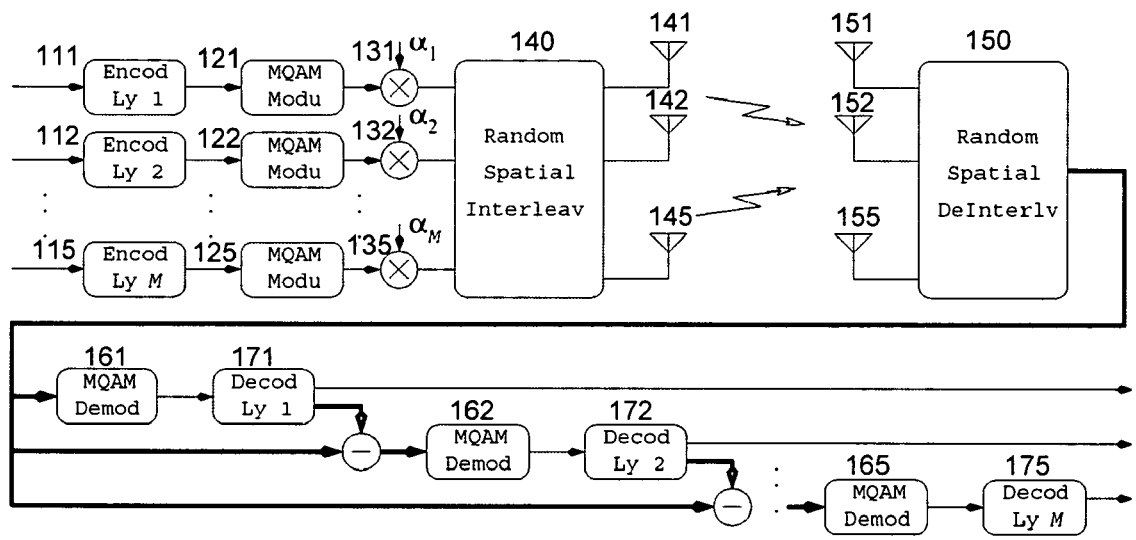
FIG. 1 illustrates a transmitter and receiver structure arranged to implement multi-layered coded modulation in accordance with an embodiment of an aspect of the invention.

FIG. 1 illustrates a multiple-input multiple-output (MIMO) system suitable for practice of an embodiment of the present invention.

As depicted in FIG. 1, the transmitter receives multiple data blocks for transmission. The information to be transmitted can either come in the form of multiple data blocks (e.g., progressive layered media data) or can be divided into multiple data blocks with appropriate lengths. The multiple data blocks are independently coded by binary random encoders $111, 112, \ldots 115$ with proper coding rates and preferably mapped to complex symbols at $121, 122, \ldots 125$. As depicted at $131, 132, \ldots 135$, each layer can be multiplied by a complex factor $\alpha_i$ for both power control and phase rotation (herein, for discussion purposes, let $\alpha_i=1, \forall i$). The symbols from all the layers are then mapped to distinct transmission slots (e.g., space-time or space-frequency slots) in the order that is determined by spatial interleaver $140$, as further described herein. The symbols are then transmitted from multiple antennas $141, 142, \ldots 145$ in K symbol intervals (or K OFDM subcarriers).

The following baseband discrete-time MIMO signal model can be used to describe the transmission:

$$y_k = \sqrt{\frac{\gamma}{N_t}} H_k \Pi_k x_k + n_k, \quad k = 1, 2, \ldots, K,$$

where $\gamma$ denotes the average transmission power from all transmit antennas (or equivalently the SNR); $N_t$ ($N_r$) denotes the number of transmit (receive) antennas; $y_k \in C^{N_r}$, $\forall k$ is the received signal vector; $H_k$ is the $N_r \times N_t$ complex MIMO channel matrix at the k-th instance of general MIMO fading channels; $\Pi_k$ is a permutation matrix for spatial interleaving whose construction is further discussed below; $x_k \in \Omega^{N_t}$, $\forall k$, is the transmitted data symbol vector taking values from the M-ary QAM or M-ary PSK constellation $\Omega$; $n_k \sim N_c(0,I)$ is a noise vector. The above signal model can be rewritten as $$y_k = \sqrt{\frac{\gamma}{N_t}} \sum_{i=1}^{M} h_{k,\pi_k[i]} x_{k,i} + n_k, \quad k = 1, 2, \ldots, K, \tag{1}$$

where $h_{k,\pi di\ k[i]}$ denotes the $N_r \times N_t^i$ spatial sub-channel matrix of the ith layer of the multi-lay coded modulation scheme which transmits from $N_t^i (N_t^i \geq 1)$ transmit antennas, with $\Sigma_{i=1}^{M} N_t^i \equiv N_t$; $\pi_k[i]$ denotes the $N_t^i$-size index set of sub-transmit antenna channel(s) use by the i-th layer transmission, which is one-to-one determined by $\Pi_k$ and can be better understood through examples depicted in FIG. 3 and described in further detail herein; $x_{k,i}$ is the $N_t^i$-size signal vector transmitted by the i-th layer at the k-th instance.

As one example, the channel model can be used to represent narrow-band MIMO channels such that data $\{x_k\}$ are transmitted in time domain and channels $\{H_k\}$ in general are time-correlated due to Doppler fading as $$\{H_k\}_{i,j} \simeq \sum_{n=-\lceil \hat{f}_d \rceil}^{\lceil \hat{f}_d \rceil} \beta_{i,j}[n] e^{j2\pi nk/K} \tag{2}$$

where $\{H_k\}_{i,j}$ denotes the (i,j)-th element of matrix $H_k$; $\hat{f}_d \triangleq f_d KT$, with $f_d$ Doppler frequency and T being the duration of one symbol interval; $\beta_{i,j}[n]$, $\forall n$ are independently circularly symmetric complex Gaussian random variables, with variances determined by the Doppler spectrum and normalized as $\Sigma_n \text{Var}\{\beta_{i,j}[n]\}=1$; it is assumed that for different (i,j)-antenna pairs, $\beta_{i,j}$ are mutually independent. As another example, the channel model can be used to represent wide-band MIMO OFDM channels such that data $\{x_k\}$ are transmitted in frequency domain and channels $\{H_k\}$ in general are frequency-correlated due to multipath fading as $$\{H_k\}_{i,j} = \sum_{n=0}^{L-1} \alpha_{i,j}[n] e^{-j2\pi nk/K} \tag{3}$$

where $\alpha_{i,j}[n]$, $\forall n$ are independent circularly symmetric complex Gaussian random variables, with variances determined by the delay spread profile of the L-tap multipath fading channels and normalized as $\Sigma_n \text{Var}\{\alpha_{i,j}[n]\}=1$; it is assumed that $\alpha_{i,j}$ are mutually independent for different (i,j)-antenna pairs.

As depicted in FIG. 1, a successive decoding structure can be employed at the receiver to recover the information data layer-by-layer, given the channel matrices Hk, $\forall k$ and the SNR $\gamma$. The transmitted signals are received by antennas 151, 152, . . . 155 and a spatial deinterleaver 150 is applied. The decoding then proceeds sequentially from layer-1 (the first decoded layer) to layer-2 (the second decoded layer) to layer-M (the last decoded layer) by applying demodulators 161, 162 . . . 165 and decoders 171, 172 . . . 175 to demodulate and decode layer-1, layer-2 . . . layer-M. respectively. The receiver performs a linear MMSE demodulation by heating both un-decoded layers' signals and ambient noise as background noise, e.g., the i-th layer symbol vector is demodulated as $$\hat{x}_{k,i} = \underbrace{\sqrt{\frac{\gamma}{N_t}} h_{k,\pi_k[i]}^H \left( I_{N_r} + \frac{\gamma}{N_t} \sum_{j>i}^{M} h_{k,\pi_k[j]} h_{k,\pi_k[j]}^H \right)^{-1}}_{\omega_{k,i}^H, LMMSE-II} \cdot \tilde{y}_{k,i} \tag{4}$$

$$= C_{k,i} \cdot \underbrace{\sqrt{\frac{\gamma}{N_t}} h_{k,\pi_k[i]}^H \left( I_{N_r} + \frac{\gamma}{N_t} \sum_{j \geq i}^{M} h_{k,\pi_k[j]} h_{k,\pi_k[j]}^H \right)^{-1}}_{\eta_{k,i}^H, LMMSE-I} \cdot \tilde{y}_{k,i} \tag{5}$$

with $$C_{k,i} = I_{N_t^i} + \frac{\gamma}{N_t} h_{k,\pi_k[i]}^h \left( I_{N_r} + \frac{\gamma}{N_t} \sum_{j>i}^{M} h_{k,\pi_k[j]} h_{k,\pi_k[j]}^H \right)^{-1} h_{k,\pi_k[i]},$$

where $I_N$ denotes the identity matrix of size N; $\tilde{y}_{k,i}$ denotes the received signals with already decoded layers' signals subtracted. The LMMSE I above denotes the traditional LMMSE filter that minimizes the mean-square error between $X_{k,i}$ and $\hat{x}_{k,i}$. The LMMSE II above denotes the LMMSE filter specifically adapted herein which, compared to LMMSE I, does not include the term $h_{k,\pi_k[i]}$ inside the inverted matrix. Moreover, it can be shown that when $N_t^i=1$, LMMSE I and LMMSE II only differ by a positive multiplier (i.e., $C_{k,i}$ degen the same signal-to-interference-plus-noise-ratio (SINR) of the LMMSE output $\hat{x}_{k,i}$. Alternatively, $\hat{x}_{k,i}$ can be written as $$\hat{x}_{k,i} = w_{k,i}^H \tilde{y}_{k,i} \tag{6}$$

$$= \underbrace{w_{k,i}^H \sqrt{\frac{\gamma}{N_t}} h_{k,\pi_k[i]} x_{k,i}}_{\text{equiv. channel gain}} + \underbrace{w_{k,i}^H \left( \sqrt{\frac{\gamma}{N_t}} \sum_{j>i}^{M} h_{k,\pi_k[j]} x_{k,j} + n_k \right)}_{\text{equiv. noise}}.$$

With the knowledge of the distribution of the equivalent noise, the soft information (the likelihood ratio) of $X_{k,i}$ can be computed from equation 6. Based on the soft information of $x_k$, the channel decoder performs decoding for layer-k. Next, layer-k's signals are reconstructed from the hard decoding output if decoding is successfUl (or from the soft decoding output if decoding has failed), and subtracted from the received signal to obtain $\tilde{y}_{k,i+1}$.

Note that a successful decoding is claimed only if all layers are correctly decoded; therefore, the receiver may opt to terminate the decoding process to save complexity where an error in any layer causes an overall decoding failure. This strategy is particularly justified in progressive layered media transmission such that the recovery of the enhancement layers (if transmitted by higher layers of the disclosed scheme) alone is useless without the correct recovery of the base layers (if transmitted by lower layers). A standard way of testing the integrity (and correctness) of the decoded data includes using a cyclic redundancy check, which implies a negligible loss of data rate.

It can be shown that the structure depicted in FIG. 1, when used in ergodic fading channels, is capable of achieving optimal performance when all M layers transmit with equal power and with coding rates computed as follows. For an M-layer system, $$\sum_{i=1}^{M} \log\det\left[I_{N_t^i} + \frac{\gamma}{N_t} h_i^H \left(I_{N_r} + \frac{\gamma}{N_t} \sum_{j>i}^{M} h_j h_j^H\right)^{-1} h_i\right] = \quad (7)$$

$$\log\det\left[I_{N_r} + \frac{\gamma}{N_t} H H^H\right],$$

See M. K. Varanasi and T. Guess, "Optimum Decision Feedback Multiuser Equalization with Successive Decoding Achieves the Total Capacity of the Gaussian multiple-access channel," in *Asilomar Conference on Signals, Systems & Computers* (November 1997). By enumerating $H=H_k$, $k=1, \ldots, K$ above and taking expectation with respect to $H \triangleq \{H_k\}_{k=1}^{K}$, $$\sum_{i=1}^{M} E_H\left\{\underbrace{\frac{1}{K}\sum_{i=1}^{M} \log\det\left[I_{N_t^i} + \frac{\gamma}{N_t} h_i^H\left(I_{N_r} + \frac{\gamma}{N_t}\sum_{j>i}^{M} h_{k,j} h_{k,j}^H\right)^{-1} h_{k,i}\right]}_{C_i(\gamma,H)}\right\} = \quad (8)$$

$$\underbrace{E_H\left\{\frac{1}{K}\sum_{k=1}^{K} \log\det\left[I_{N_r} + \frac{\gamma}{N_t} H_k H_k^H\right]\right\}}_{C(\gamma,H)},$$

where $E_H\{f(H)\}$ denotes the expectation of f(H) over H; $E_H C_i(\gamma,H)$ is the average mutual information of the i-th layer of successive decoding; and and $E_H C(\gamma,H)$ is the ergodic capacity of this block fading MIMO channel. Note the following:

The equality in equation 8 indicates that the disclosed modulation scheme is capable of achieving the capacity of ergodic MIMO fading channels under the assumption that Gaussian signaling is employed with coding rate $r_i = E_H C_i(\gamma,H)$ and successive LMMSE-based cancellation and decoding is performed at each layer. In particular, the equality holds true only when all M layers transmit with equal power, i.e., $\alpha_i = 1$, $\forall i$.

The ergodic-capacity-achieving property always holds, regardless of the specific values of $(N_r, N_t, N_t^i, \forall i)$. At the receiver side, the successive decoding at the i-th layer is concerned with an equivalent $N_t^i$-input $N_r$-output vector channel (if $N_t^i > 1$). Hence, there exists a possible tradeoff between the decoding complexity reduction (M instead of $N_t$ decoders, $M < N_t$) and the demodulation complexity increase (demodulator for vector-input instead of for scalar-input).

The ergodic-capacity-achieving property of the modulation scheme hinges on the fact that each layer experiences ergodic fading channels with infinite diversity order. In particular, there is no loss of optimality if each layer transmits only from fixed transmit antenna(s) and thus without explicitly exploiting transmit-antenna diversity.

In practice, the ergodic MIMO fading channel capacity can be approached (by a fraction of dB) by coded modulation schemes based on binary random codes (e.g., turbo codes or LDPC codes) with very large block size and by successive LMMSE cancellation and decoding (as discussed above). Note that the coded modulation design motivated by the equation above does not follow the conventional design path started from pairwise error probability (PEP) of the decoder, but, nonetheless, leads to pragmatically good performance in MIMO systems.

In non-ergodic fading channels, due to the limited observations of channel states in one data block, the outage capacity is commonly used as a measure of performance limit. For instance, the outage probability to support rate $r_i$ transmission of the i-th layer is defined as $P_{out}^i(\gamma,r_i) = \Pr(C_i(\gamma,H) < r_i) = E_H\{1_{\{C_i(\gamma,H) < r_i\}}\}$, $\gamma \in R^+$, $r_i \in R^+$. Intuitively, in order to maximize the total information rate, it is desirable to provide equal error protection for all layers at all SNRs $\gamma \in R^+$, i.e., $P_{out}^i(\gamma, r_i) = P_{out}^j(\gamma, r_j)$, $\forall i \neq j$, $\forall \gamma$. This objective is readily achieved in ergodic fading channels. The design, however, is generally more involved in non-ergodic channels, since the function $P_{out}^i(\gamma, r_i)$ is characterized by the statistics of H, in addition to the SNR $\gamma$ and the design rate $r_i$. The notion of achieving equal error protection at all SNRs $\gamma \in R^+$ is valid only if $P_{out}^i(\gamma, r_i)$, $\forall i$ have the same shape and differ only by shift, which is in general not true in non-ergodic fading channels.

Since it is generally infeasible to achieve equal error protection for layers at all SNRs, it is advantageous to relax the design problem such that each layer's outage probability is upper bounded by the same target error rate. The optimization problem can be stated as $$\max \sum_{i=1}^{M} r_i \quad (9)$$

$$\text{s.t.} \quad P_{out}^i(\gamma, r_i) \leq \hat{P}_e, \forall i,$$

$$r_i > 0, \forall i.$$

It can be then shown that the optimal solutions to the above optimization problem, when existing for given $\gamma$, are $\{r_i^*\}_{i=1}^{M}$ satisfying $$P_{out}^1(\gamma, r_1^*) = P_{out}^2(\gamma, r_2^*) = \ldots = P_{out}^M(\gamma, r_M^*) = \hat{P}_e \quad (10)$$

where the superscript * denotes the optimal value of individual variables. Note that the parameters that are explicitly optimized above are the information rates $r_i$ of all layers (achieved jointly by binary coding and MPSK or MQAM constellation; it is possible to have $r_i \geq 1$); in fact, the optimal solutions also implicitly depend on space-time (or space-frequency) channel interleaving functions, as discussed below. It should be further remarked that the solution to the above equation only achieves the equal error protection at a particular SNR (such as to satisfy the given target error rate $\hat{P}_e$), instead of all SNRs.

It should also be noted that it is possible to also jointly optimize $\alpha_i$. Nevertheless, it is advantageous to avoid it because in practice varying $\alpha_i$ will result in larger peak-to-average-power ratio (PAPR) at each transmit antenna due to the use of spatial interleaver; and the joint optimization of $r_i$ and $\alpha_i$ is also numerically demanding.

Note that equation 10 can be solved by solving M subproblems, as $P_{out}^i(\gamma, r_i^*) = \hat{P}_e$, $i = 1, \ldots, M$. Because an LMMSE demodulator of a particular layer always treats the other undecoded layers signals as interference, and the information rate $r_i$ only affects the decoding performance but not the LMMSE demodulation performance. Assume each layer only transmits from one transmit antenna (i.e., $N_t^i = 1$, $\forall i$), then it can be shown from the signal model above that the instantaneous SINR $\xi$ at the output of the i-th layer LMMSE demodulator is given by $$\xi_{k,i} = \frac{\gamma}{N_t} h_{k,\pi_k[i]}^H \left( I_{N_r} + \frac{\gamma}{N_t} \sum_{j>i}^{M} h_{k,\pi_k[j]} h_{k,\pi_k[j]}^H \right)^{-1} h_{k,\pi_k[i]} \quad (11)$$

Using a Gaussian approximation of the output of the LMMSE filter, the instantaneous mutual information of the i-th layer in equation 8 can be re-written as $$C_i(\gamma, \mathcal{H}) = \frac{1}{K} \sum_{k=1}^{K} \underbrace{\log(1+\xi_{k,i})}_{r_{ideal}(\xi_{k,i})} \quad (12)$$

In practice, given the same ($\gamma$, H), the information rate supported by practical coded modulation is always strictly less than $r_{ideal}(\xi_{k,i})$.

As a heuristic approach, one can replace each term of $r_{ideal}(\xi_{k,i})$ by the actual rate function of practical coded modulation schemes, e.g., $r_{ldpc}(\xi)$ of LDPC codes. To be more specific, the function $r_{ldpc}(\xi)$ can be defined as the information rate provided by LDPC codes at the SNR of $\xi$ and the FER of $\hat{P}_e$, $$r_{ldpc}(\xi) = \{r_{ldPC} \in R^+ | P_{FER}(\xi, r_{ldpc}) = \hat{P}_e, \xi \in R^+\} \quad (13)$$

Note that the FER performance is well represented by the outage probability of the fading channel when the block size is large. The function $r_{ldpc}(\xi)$ can be increased by properly optimizing the LDPC code design and construction in AWGN channels which leads to better performance in MIMO fading channels. A rate function of practical coded modulation, e.g., $r_{ldpc}(\xi)$ of the ensembles of practical LDPC codes, can be generated as follows: (1) construct LDPC codes with a given code block length and with various coding rates (e.g., $\hat{r}=0.1k$, k=1, . . . , 9) from LDPC code ensembles; (2) run Monte Carlo simulations of the LDPC decoding in discrete-input-continuous-output AWGN channels, where LDPC code bits are modulated into discrete constellation with Gray mapping; (3) read the minimum SNR $\hat{\xi}$ required to achieve a target FER (e.g., 5e-3) from the FER-vs-SNR plots for various rates; (4) by polynomial interpolation of all pairs of $\hat{r}$ and $\hat{\xi}$, $r_{ldpc}(\xi)$ can be obtained.

Although spatial interleaving is unnecessary to achieve capacity in ergodic MIMO fading channels, spatial interleaving plays a more important role in non-ergodic MIMO fading channels. Consider three possible candidates for a spatial interleaving function: (I) no spatial interleaving; (II) random (uniform) spatial interleaving; and (III) spatial ordering (assisted with a low-rate feedback channel). The disadvantages of a type-I design in non-ergodic channels is evident—the transmit-antenna diversity is not exploited for individual layers. The type-II design uniformly exploits the transmit antenna diversity for each layer. This goal can be achieved by the known D-BLAST structure as depicted in FIG. 3B. Alternatively, a random design can be utilized which is illustrated by FIG. 3A. More specifically, at the k-th instance, k=1, . . . , K, a uniform permutation set $\hat{A}$ of the natural set $A=\{1, 2, \ldots, N_t\}$ is independently generated. Let $$\pi_k[i] = \{\hat{\mathcal{A}}\}_{n_1}^{n_2},$$

with $$n_1 = 1 + \sum_{j=1}^{i-1} N_t^j$$

and $$n_2 = \sum_{j=1}^{i} N_t^j.$$

Figure 3:
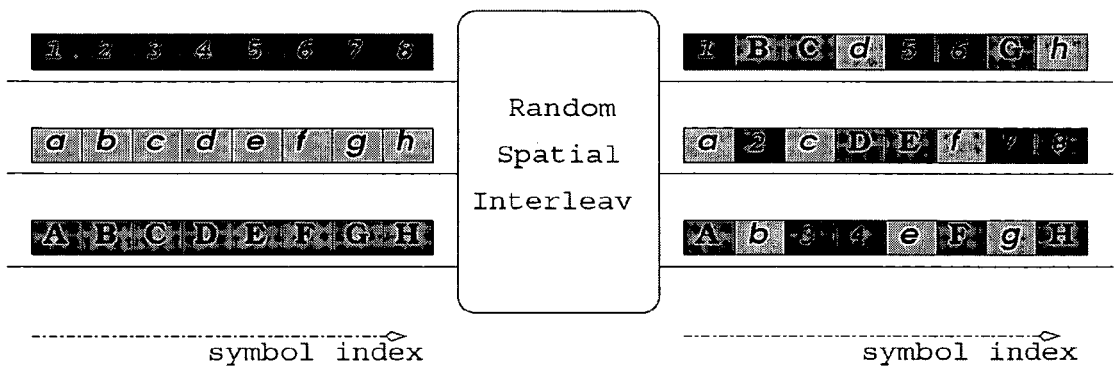
FIG. 3 illustrates examples of different spatial interleaver designs.
Figure 3:
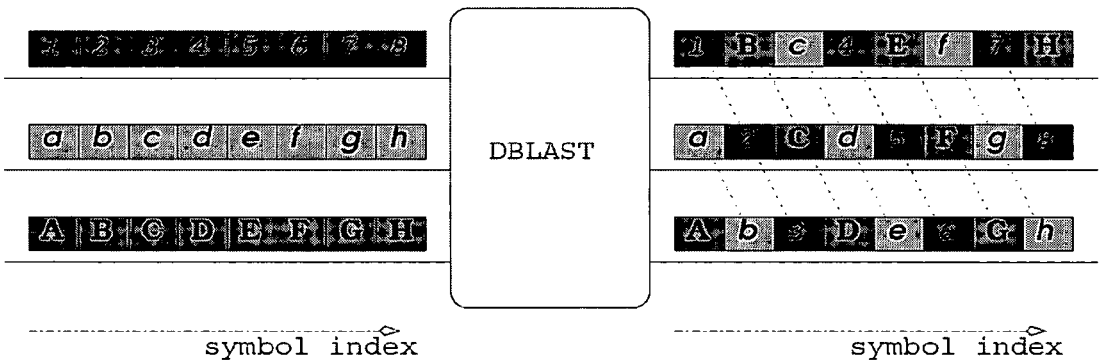

It can be shown that any realization of a type-II spatial interleaver shares the property that $$\frac{1}{K} \sum_{k=1}^{K} 1_{j \in \pi_k[i]} \xrightarrow{K \to \infty} \frac{1}{N_t}, \forall j,$$

meaning that the i-th layer employs each transmit antenna evenly. Illustrative examples of a type-II random spatial interleaver design and the D-BLAST design are shown in FIG. 3. The type-III design is described as follows. The basic idea of a type-III design is to rank spatial sub-channels' quality, and based on that ranking to transmit a different layer from the appropriate transmit antenna. First, the Frobenius norm of each spatial sub-channel $$q_i \triangleq \|h_i\|_F,$$

which is adopted to indicate the sub-spatial channel quality, is computed at the receiver. Second, by ranking all $q_i$'s at the receiver, the resultant index set $\{S_i\}_{i=1}^{M} = \{S_i \in Z^+, 1 \leq S_i \leq M | q_{s_1} \geq q_{s_2} \geq \ldots \geq q_{s_M}\}$ is sent back to the transmitter, through a low-rate feedback channel. Third, the transmitter then transmits layer-i from the $S_i$-th transmitter antenna $\forall i$, with the information rate $r_i$. For simplicity, we drop the subscript k and assume $N_t^i = 1$, $\forall i$. Note that for a type-III design, in order to reduce the implementation cost, the rates $\{r_i\}$ are preferably determined off-line (by following a procedure similar to the one described below) based on the ensemble of the equivalently ranked channels $\{h_{S_i}\}$, rather than the instantaneous channel realizations. Loosely speaking, the type-II design reflects the idea of (passive) equal-gain transmission, while the type-III design practices the (proactive) selective transmission. Numerical experiments show that both type-II and type-III yield better performance than a type-I design in non-ergodic fading channels. Type-II provides relatively more consistent and superior performance in various channel profiles; a type-III design could be useful in support of higher information rate for layer-1 transmission (the layer first decoded and faced with the strongest interference).

Figure 2:
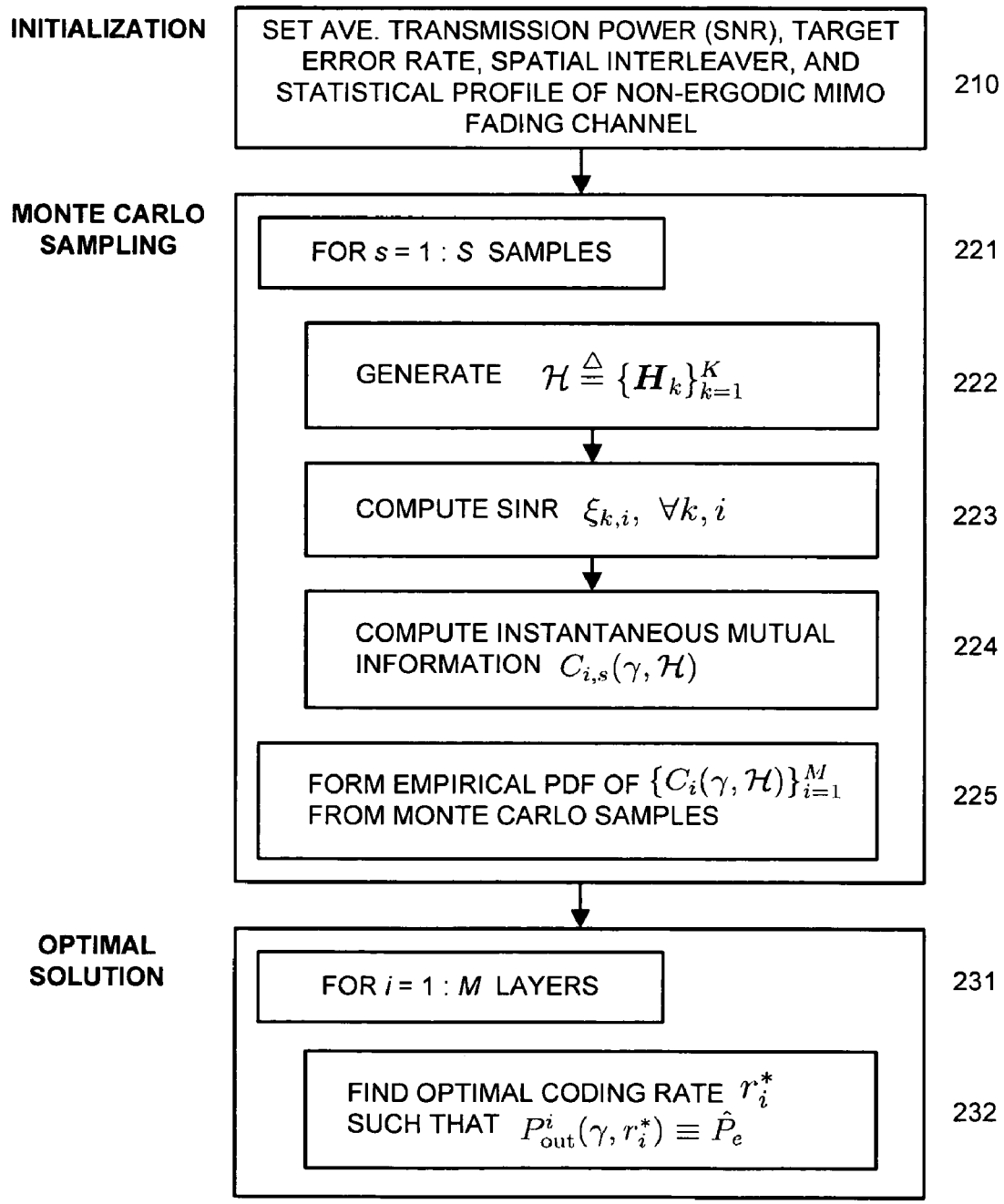
FIG. 2 is a flowchart of a design procedure for the multi-layered coded modulation arrangement.

FIG. 2 is a flowchart illustrating the optimization of the modulation design for non-ergodic fading channels, in accordance with an embodiment of an aspect of the invention. First, initialization is performed. At 210, $\gamma$ and $\hat{P}_e$ are set, as well as the statistical profiles (delay profile, Doppler spectrum) of the non-ergodic MIMO fading channels. The spatial interleaver $$\{\prod_k\}_{k=1}^K$$

is also set. Then, Monte Carlo sampling is performed at steps 221 to 225. S samples are generated where S is a sufficiently large number so as to sample the non-ergodic channel matrices $H_k$. At step 222, generate $$\mathcal{H} \triangleq \{H_k\}_{k=1}^K,$$

for example, by using equations 2 or 3. At step 223, compute the SINR $\xi_{k,i}$, $\forall k$, i using equation 11 above. Then, at step 224, compute the instantaneous mutual information $C_{i,s}(\gamma, H)$ using equations 12 and 13. Finally, after computing the above for each sample, at step 225, an empirical probability distribution function is formed of $$\{C_i(\gamma, \mathcal{H})\}_{i=1}^M$$

from the Monte Carlo samples. Then, at steps 231 and 232, the optimal solution is obtained. For each of the M layers, the coding rate $r_i^*$ is found such that $P_{out}^i(\gamma, r_i^*) = \hat{P}_e$. This can be accomplished by line search. It can be shown that for scalar flat-fading channels at-fading channels the optimized design obtained by the above is capacity-achieving, universal (independent of the statistics of the channel coefficients), and of equal error protection at all SNR's. For general non-ergodic fading channels, however, the design is not capacity-achieving, is not universal, and only achieves equal error protection at a single SNR.

It is useful to compare the disclosed modulation scheme with existing coded modulation schemes. Although the present modulation scheme has a superficial structural similarity to multilevel coded modulation (MLC), the design outputs of MLC are coding rates and constellation partition of different levels, where the design outputs of the present approach are coding rates and transmission powers of different layers. See, e.g., U. Wachsmann et al., "Multilevel Codes: Theoretical Concepts and Practical Design Rules," IEEE Trans. Inform. Theory, Vol. 45, pp. 1361-91 (July 1999). The design of both schemes in non-ergodic fading channels are usually dependent on the channels' statistical profiles. Both schemes can asymptotically achieve the capacity of ergodic fading channels and approach the capacity of non-ergodic fading channels, however by different routes. MLC computes multi-stage decoding where individual level's decoding is conditioned on the decoding results of earlier-decoded levels, and the mutual information of each MLC level's equivalent channel is noise-limited, e.g., for a three-level 8-ASK MLC scheme, each level's mutual information goes to one (the maximum value for binary-input signaling of each MLC level) as SNR goes to infinity. On the contrary, the present invention utilizes successive cancellation decoding where an individual layer's decoding is independent of the decoding results of earlier-decoded layers (assuming that the decoded layers' signals are ideally cancelled out), and the mutual information of each layer's equivalent channel is interference-limited, e.g., for a two-layer example above, the SINR of the layer-1's equivalent channel converges to the signal-to-interference (SIR) $|\alpha_1|^2/|\alpha_2|^2$ as SNR $\gamma$ goes to infinity.

Bit-interleaved coded modulation (BICM) is so far the most widely-used coded modulation scheme in the large block size regime, because of its simple and robust design and capacity-approaching performance. It is worth noting that in single-antenna systems, turbo signal processing (i.e., the iteration between demodulator and decoder) is not needed and a conventional non-iterative receiver is enough to achieve optimum performance as long as Gray mapping is used. See G. Caire et al., "Bit-Interleaved Coded Modulation," IEEE Trans. Inform. Theory, Vol. 44, pp. 927-46 (May 1998). On the other hand, in MIMO systems, turbo iterative processing is crucial to successively cancel out the spatial interference, even when an optimal APP demodulator is used. Note that the present invention can also be used to carry out iterative successive-decoding, for better receiver performance in non-ergodic fading channels and for finite-length codes. In practice, however, the extra processing delay introduced in turbo signal processing is not always affordable, and it is accordingly advantageous herein to focus on low-processing-delay receiver designs. The non-iterative BICM-LMMSE (i.e., BICM employing a LMMSE demodulator) and the above-disclosed receivers have roughly the same computational complexity and processing delay in transmitting the same total information rate and using the same modulation constellation, based on the observation that the complexity and the delay of both demodulation and decoding are approximately linear in block size. Furthermore, if the block size effect on decoding performance is ignored, the non-iterative BICM-LMMSE demodulator performance is the same as the layer-1 demodulation performance in the present scheme, but the layer-1 performance after decoding is better than that of BICM-LMMSE. This is because the optimized scheme described above employs for its layer-1 stronger error-correction coding than that for BICM-LMMSE, assuming both schemes have the same total information rate and the same constellation. Indeed, based on simulations, the optimized modulation scheme herein disclosed can even outperform a non-iterative BICM-APP receiver. From simulation examples in realistic MIMO fading channels, the present invention with practical coded modulation (QPSK, block size 4096) can perform only 2.5 dB from the outage capacity in support of 3.0 bits/Hz/s rate transmission. For coded MIMO systems, as the overall diversity order goes to infinity (or practically very large), it is observed that the relative performance gain by applying an optimal APP demodulator diminishes compared to the use of a linear MMSE demodulator.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. A method of modulation in a wireless communication system, comprising:
   receiving at least a first and second data block;
   encoding independently the first and the second data blocks in separate layers and mapping the encoded data blocks into first and second symbols;

applying a spatial interleaver to the first and second symbols before transmission, so that a receiver applying successive cancellation decoding to recover layer-by-layer at least the first data block from the transmission; and transmitting each layer at an optimized information rate, wherein the optimized information rate for each layer is determined by forming an empirical probability distribution function of mutual information at each layer.

2. The method of claim 1 wherein the optimized information rate at which each layer is transmitted is such that each layer's outage probability is upper bounded by a target error rate.

3. The method of claim 1 wherein the optimized information rates an empirical probability distribution function is formed from Monte Carlo samples.

4. The method of claim 1 wherein the spatial interleaver arranges the symbols in accordance with a uniform permutation set.

5. The method of claim 1 wherein the spatial interleaver arranges the symbols in accordance with rankings of spatial sub-channels quality as provided through a feedback channel.

6. The method of claim 1 wherein the transmission utilizes two or more transmit antennas.

7. The method of claim 1 wherein the transmission occurs across a non-ergodic channel.

8. A transmitter for a wireless communication system, comprising:

a plurality of encoders and modulators arranged in layers to independently encode at least a first and second data block in separate layers and map the encoded data blocks into first and second symbols;

a spatial interleaver adapted to receive the first and second symbols and rearrange the first and second symbols before transmission, the transmission arranged to allow a receiver applying successive cancellation decoding to recover layer-by-layer at least the first data block from the transmission; and two or more transmit antennas which transmit each layer at an optimized information rate, wherein the optimized information rate for each layer is determined by forming an empirical probability distribution function of mutual information at each layer.

9. The transmitter of claim 8 wherein the optimized information rate at which each layer is transmitted is such that each layer's outage probability is upper bounded by a target error rate.

10. The transmitter of claim 8 wherein the empirical probability distribution function is formed from Monte Carlo samples.

11. The transmitter of claim 8 wherein the spatial interleaver arranges the symbols in accordance with a uniform permutation set.

12. The transmitter of claim 8 wherein the spatial interleaver arranges the symbols in accordance with rankings of spatial sub-channels quality as provided through a feedback channel.

13. The transmitter of claim 8 wherein the transmission occurs across a non-ergodic channel.

14. A receiver for a wireless communication system, comprising:

a spatial deinterleaver adapted to receive a transmitted signal having at least two data blocks of symbols in seperate layers and output a deinterleaved signal, wherein each layer in the received signal is transmitted at an optimized information rate, wherein the optimized information rate for each layer is determined by forming an empirical probability distribution fUnction of mutual information at each layer; and a plurality of demodulators and decoders coupled to the spatial deinterleaver, the plurality of demodulators and decoders arranged in layers to recover a first data block in a first layer from the deinterleaved signal and cancel the recovered first data block from the deinterleaved signal before recovering a next data block in a next layer.

15. The receiver of claim 14 wherein the optimized information rate of each layer is such that each layer's outage probability is upper bounded by a target error rate.

16. The receiver of claim 14 wherein the empirical probability distribution function is formed from Monte Carlo samples.

17. The receiver of claim 14 wherein the spatial deinterleaver rearranges symbols in the transmitted signal in accordance with a uniform permutation set.

18. The receiver of claim 14 further comprising two or more receive antennas to receive the transmitted signal.

19. The receiver of claim 14 wherein the spatial deinterleaver is adapted to receive the transmitted signal which is transmitted across a non-ergodic channel.

20. The receiver of claim 14 wherein the spatial deinterleaver rearranges the symbols in accordance with rankings of spatial sub-channels quality as provided through a feedback channel.

* * * * *